A. BAUSCHLICHER.
GEARING.
APPLICATION FILED FEB. 5, 1910.
980,909.
Patented Jan. 10, 1911.
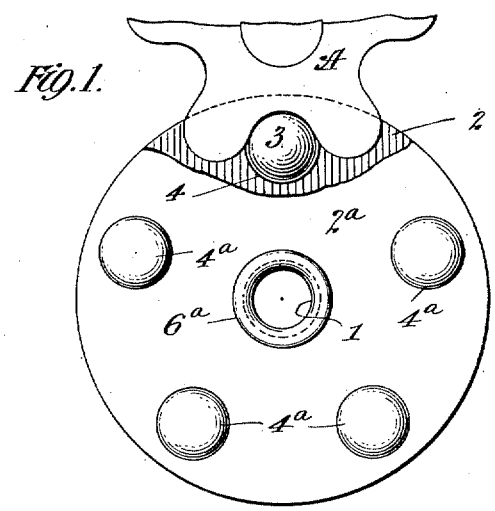
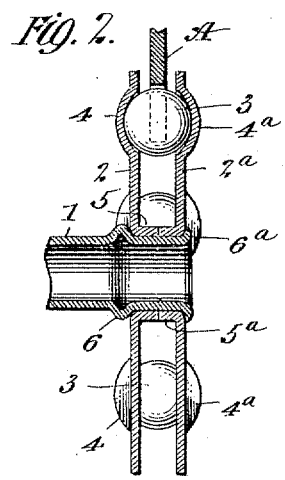
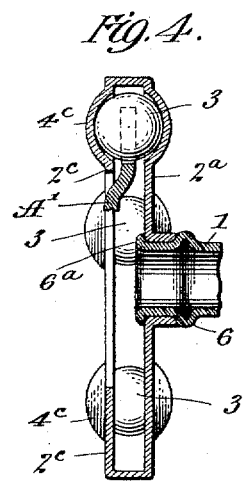
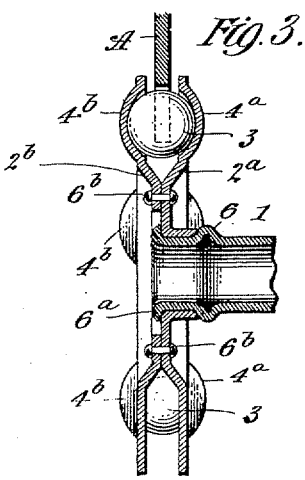
Witnesses:
Inventor
August Bauschlicher
By his Attorney

UNITED STATES PATENT OFFICE.

AUGUST BAUSCHLICHER, OF FRANKFORT-ON-THE-MAIN-SACHSENHAUSEN, GERMANY.

GEARING.

980,909.  Specification of Letters Patent.  Patented Jan. 10, 1911.

Application filed February 5, 1910.  Serial No. 542,164.

*To all whom it may concern:*

Be it known that I, AUGUST BAUSCHLICHER, a subject of the Emperor of Germany, residing at Stegstrasse 64, Frankfort-on-the-Main-Sachsenhausen, Germany, have invented certain new and useful Improvements in Gearing, of which the following is a specification, reference being had therein to the accompanying drawing.

This invention relates to gear wheels of the type in which the engaging elements or teeth are in the form of friction members, such as balls or rolls, and the invention consists in various improvements directed more particularly to the form and construction of the wheel, and the manner of mounting the friction members, whereby a strong and durable gear wheel is produced in which the friction of the relatively moving parts is reduced to a minimum, and which will operate with effectiveness in action.

In the accompanying drawings:—Figure 1 is a side elevation of my improved wheel in its preferred form. Fig. 2 is a vertical longitudinal section on the line $a-a$. Fig. 3 is a longitudinal sectional elevation of a wheel in modified form. Fig. 4 is a similar view of still another modification.

Referring to Figs. 1 and 2, my improved wheel comprises a hub or sleeve 1, to which are firmly connected two opposing radial plates 2, $2^a$, between which are mounted at intervals, friction members in the form of balls or spheres 3, confined and held in opposing sockets 4, $4^a$, formed in the adjacent faces of the plates. These plates are preferably formed of resilient material so that they will yieldingly embrace the balls between them in the holding sockets, and in this manner automatically compensate for any wear which may take place between the parts. The sockets 4, $4^a$, in which the balls are seated, are formed by bending the metal of the plates outwardly, thereby forming depressions on one side of the plates and corresponding protuberances on the opposite side; and in order that the contact of the balls in the sockets will be confined to a limited area, so as to reduce the friction to a minimum, the curve of the sockets is of a greater radius than that of the balls, the result being that the walls of the sockets will bear at diametrically opposite points only on the balls. At their inner edges the plates are formed with inwardly turned flanges 5, $5^a$, which abut and surround the hub collar 1, being fixedly confined thereon between annular shoulders 6, $6^a$, on the hub collar.

In operation, the wheel is adapted to coöperate with a driving or driven member A of such form that the teeth of the latter will extend in between the plates 2, $2^a$, and engage the balls 3, the latter turning on an axis coincident with the neutral points of contact of the balls with the plates, and in this manner creating a rolling contact between the balls and the teeth of the coöperating member, whereby the driving action while being positive and direct will be attended with practically no wear. In the event of wear of the balls in their sockets, the spring of the plates will maintain them at all times in contact and thereby prevent any looseness or play.

As regards the form of the ball sockets which adapts them to bear on the balls at diametrically opposite points only, it will be understood that such action is independent of the capability of the plates to yield or embrace the balls with spring pressure. Therefore, my invention is intended to include the sockets of this form, whether the plates are yielding or rigid.

In Fig. 3, I have shown my improved wheel in slightly modified form. In this case, one of the opposing plates $2^b$ is of ring-like form, and has its inner edge bent inwardly and extended toward the companion plate and firmly fastened thereto near the outer edge of the plate by rivets $6^b$, or other appropriate fastening means, sockets $4^b$ being formed in the ring-like plate at intervals and opposite the sockets in the companion plate, and the balls being held within these sockets, as in the first instance described.

In Fig. 4, still another modification is shown. Here it will be seen that one of the opposing plates is in the form of an inwardly extending annular flange $2^c$, formed by bending the outer edge of the companion plate inwardly at the side of the body of the plate, sockets $4^c$ being formed in this flange which in connection with the opposing sockets in the body of the plate confine the balls in place. In this case, the gear wheel constitutes an internal gear and is adapted to coöperate with a driving or driven member $A'$ situated within the friction members of the wheel.

While I have illustrated and described my invention in the forms which I deem preferable for practical purposes, I desire it to be understood that the invention is not limited to any specific form or arrangement of the parts except in so far as such limitations are specified in the claims.

Having thus described my invention, what I claim is:—

1. In a gear wheel, the combination with opposing plates provided in their adjacent faces at intervals with curved sockets, of balls seated in the sockets, the curvature of said sockets being of a greater radius than the radius of the balls; whereby the walls of the sockets will contact with the balls at diametrically opposite neutral points.

2. In a gear wheel, the combination of opposing plates provided at intervals in their adjacent faces with curved sockets or depressions, and balls seated and confined in said sockets and having contact therewith at diametrically opposite points only.

3. In a gear wheel, the combination with opposing yielding plates, of balls held between the plates and confined by spring pressure.

4. In a gear wheel, the combination with opposing resilient plates, of balls situated between the same and held yieldingly thereby.

In testimony whereof I have affixed my signature in presence of two witnesses.

AUGUST BAUSCHLICHER.

Witnesses:
JEAN DICHMANN,
JEAN BOPP.